INVENTORS
JOHN B. GILLETT
MICHAEL H. HALLETT

BY

AGENT

United States Patent Office 3,509,380

Patented Apr. 28, 1970

3,509,380

HIGH SPEED LATCH CIRCUIT ARRANGEMENT FOR DRIVING A UTILIZATION DEVICE

John B. Gillett, Whitenap, Romsey, and Michael H. Hallett, Chandlers Ford, England, assignors to International Business Machines Corporation, Armonk, N.Y., a corporation of New York Filed Oct. 26, 1966, Ser. No. 589,540
Int. Cl. H03k *3/12*
U.S. Cl. 307—289 1 Claim

ABSTRACT OF THE DISCLOSURE

The invention provides a bistable switching circuit arrangement for driving, with zero delay, a utilization device in response to driving pulses applied concurrently to the bistable switching circuit and the utilization device by way of a direct circuit path containing a common terminal serving both as input and output. By virtue of this arrangement, driving signals are simultaneously applied to the bistable switching circuit and the utilization device to cause the utilization device to respond substantially immediately.

This invention relates to high speed circuitry and more particularly to a latch circuit having a terminal serving both as input and output. By virtue of this novel configuration, speeds in gating action heretofore unattainable by prior art devices have been achieved.

Despite recent advances in solid state technology, time lag due to circuit coupling and the transition time in the fall and rise time of circuit components have limited the switching speeds of the prior art latches.

In other more sophisticated latch designs, lag time has been somewhat reduced but other problems such as drift, voltage variations in triggering voltages have necessitated offsetting or compensating devices, thus adding further to the cost of these latches.

The present invention by virtue of its novel configuration avoids not only the time lags encountered by the prior art switching latches but also the costly compensating devices required for assuring stability and reliability.

The primary object of the present invention resides in a unique latch configuration by which the input serves also as an output and by means of which an extremely fast and reliable switching action is achieved with much greater economy than has been possible by the prior art devices.

Another object is to provide an economical latch in which the number of components is considerably less than that utilized by comparable latches of the prior art.

Yet another object resides in a latch having a unique circuit configuration in which high speed, reliability and economy are achieved.

Still another object resides in a novel latch configuration in which a single terminal is utilized both as input and output whereby maximum volumetric efficiency is realized in component miniaturization and packaging.

The foregoing and other objects, features and advantages of the invention will be apparent from the following more particular description of preferred embodiments of the invention, as illustrated in the accompanying drawings.

Figure 1:
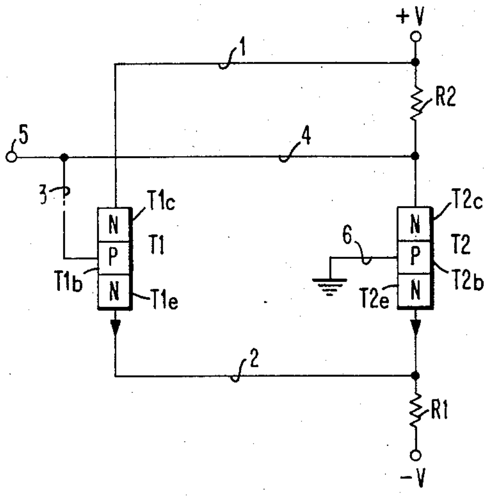
FIG. 1 shows the basic configuration of the novel latch circuit.

Referring to FIG. 1, the basic latch configuration comprises a pair of NPN type transistors T1 and T2, each having an emitter, base and collector elements identified respectively as T1*e*, T1*b*, T1*c*, and T2*e*, T2*b*, T2*c*. The collectors T1*c* and T2*c* are interconnected to a source of positive voltage +V by way of a circuit path which includes resistor R2. The emitters T1*e* and T2*e* are interconnected by way of a circuit path 2 which in turn is connected to a source of negative voltage —V by way of a resistor R1, the resistance value of R1 being much less than that of R2. The base T2*b* is connected to a grounded circuit path 6. An input/output terminal 5 of the latch configuration forms a part of a circuit path that includes lines 3 and 4 to interconnect the base T1*b* of transistor T1 with the collector T2*c* of transistor T2.

An essential characteristic of the latch configuration is that the saturated emitter to collector voltage drop is less than the emitter to base voltage drop.

In the operation of the latch configuration, input/output terminal 5 is normally at a positive level at which level the transistor T1 is conducting thereby imposing a potential below that of input/output terminal 5 to keep the transistor T2 in a state of nonconduction, this being the off state of the latch. As the potential on the input/output terminal T5 is lowered, the potential on the common emitters also falls, until a level is reached whereat the transistor T2 starts conducting whereupon the potential of the collector T2*c* falls. The fact that the emitter to collector voltage drop is greater than the emitter to base voltage drop enables the transistor T2, when saturated, to hold the potential at input/output terminal 5 below its initial positive level. Since the emitter to collector voltage of the transistor T2 is applied across the base and emitter of the transistor T1, the potential of the latter is maintained by the potential across the transistor T2 thus providing the latch with its on state.

The latch may be restored to its original off state by raising the potential at the input/output terminal 5 to its initial positive level. One important advantage of this circuit configuration is that only a relatively low power signal is required to set the latch. Another advantage is that a reset circuit is not necessary when the input signal to the input/output terminal 5 has a positive value.

Figure 2:
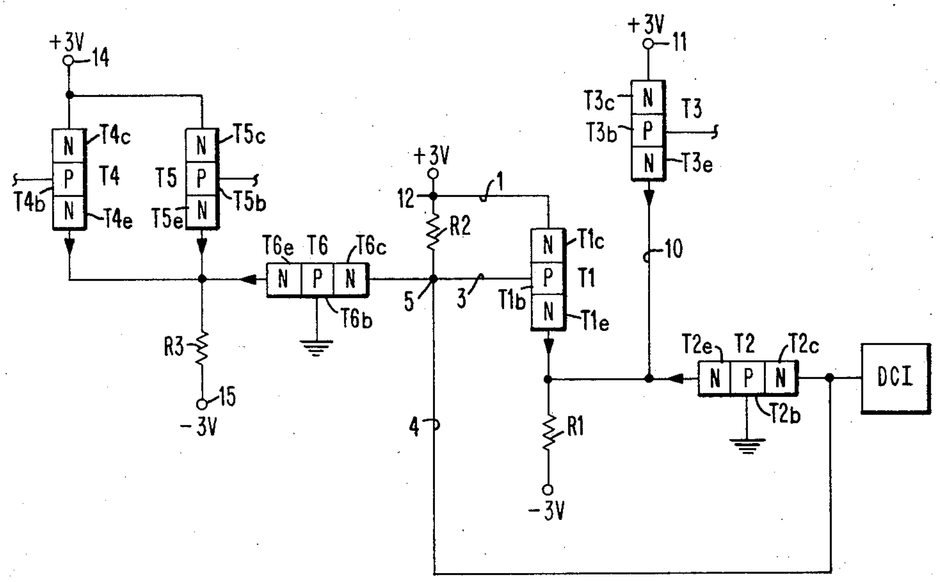
FIG. 2 shows the basic configuration of FIG. 1 utilized in a circuit arrangement having an input switching circuit and an output utilization means.

The latch configuration is utilized in a circuit arrangement of FIG. 2 in which are shown the latch configuration constituted of the transistor T1 and T2 and the resistors R1 and R2. Also included in this configuration is a reset circuit 10 which includes a transistor T3 connected to a +3 volt source 11. A+3 volt source 12 is connected to the input/output terminal 5 in turn connected to the base T1*b* of the transistor T1 by way of line 3. The input/output terminal 5 is also connected to the collector T2*c* of the transistor T2 by way of line 4 and also to a utilization means DCI (direct coupled inverter). The input/output terminal 5 is connected to a collector T6*c* of a transistor T6 having a grounded base T6*b* and an emitter T6*e* connected to a positive OR configuration constituted of transistor T4 and T5 whose collectors T4*b* and T5*b* are interconnected to a +3 volt source 14. The emitters T4*e* and T5*e*, respectively, are connected to a resistor R3 in turn connected to a —3 volt source 15.

In the operation of this circuit arangement, a positive signal applied to either base T4*b* or T5*b* enables conduction through the transistor T6 to provide a drop in the collector voltage of T6*c* and hence at the input/output terminal 5 to cause the latch configuration, in a manner previously explained, to be driven to its on state. It may be appreciated that direct connection from the input/output terminal 5 by way of line 4, to the utilization means, DCI, enables the latter to be influenced immediately by a voltage excursion occurring at the input/output terminal 5 and during which excursion the latch undergoes a transition from its off state to its on state, resulting in a latch back completion after the utilization means has been driven, by virtue of which an extremely fast response is transmitted to the utilization means without necessity of going through a latch configuration or any other switching device in which lag time is an inherent characteristic.

The restoration of the latch is occasioned by applying to the base of transistor T3 an appropriate signal to cut off T2 and enable T1 to conduct to restore the latch to its off state.

It may be appreciated that the presence of the reset circuit is only necessary in a configuration where a positive signal level is not available at the input/output terminal 5. In the present configuration, since a positive signal level is available at the input/output terminal 5, the reset circuit may be dispensed with. By virtue of this consideration and the fact that a single terminal is utilized as both input and output, a maximum in volumetric efficiency is realized in design miniaturization and component packaging.

To demonstrate the reliability of the switching action of the latch in the configuration of FIG. 2, in which commercially availabe transistors, Type 10M7, are employed, and in which resistors R2 and R1 have assigned values of 750 ohms and 130 ohms, respectively, with the DCI utilization means having approximately 550 ohms, the following analysis is submitted. The extreme condition of operation will now be considered in which the collector emitter drop across transistor T6 is measured at 0.30 volt and its base to emitter drop 0.50 volt. This condition results in a potential of −0.20 volt at the input/output terminal 5. The transistor T1, under this condition, has a base to emitter drop of 0.60 volt to provide a negative voltage of −0.80 volt at the emitters T1*e* and T2*e* which provide a forward bias of 0.80 volt across the transistor T2, enabling approximately 1 milliamp of collector current to flow therethrough. The condition, however, at −0.20 volt is unstable and, as a consequence, the voltage is driven more negative to cause current to flow into the positive feedback path which includes line 4 and the collector T6*c* of the transistor T6. From this point on, current increases and becomes stabilized at approximately −0.40 volt to provide stability in the latching action.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A bistable switching circuit having a common terminal serving both as input and output, said terminal interconnecting a source of driving signals with a utilization device comprising:

first and second transistors of the NPN type, each including emitter, base and collector elements;

a source of positive and negative voltages including a ground;

a first circuit path interconnecting the collector of said first transistor to said source of positive voltage;

a second circuit path including a resistor interconnecting the collector of said second transistor to said source of positive voltage;

a third circuit path interconnecting the emitters of said transistors to said source of negative voltage, said third path further including a resistor;

a fourth circuit path connecting the base of said second transistors to said ground;

a fifth circuit path, including said common input/output terminal, directly interconnecting the base of said first transistor with the collector of said second transistor and with said utilization device whereby the latter is directly controlled with substantially zero delay while said circuit is switched with relative delay to one of its stable states, and maintaining control upon said utilization device when said circuit assumes a stable state;

a reset circuit connected to said third circuit path for supplying a reset signal to said switching circuit for setting the latter to an OFF state;

a positive logical OR configuration of NPN transistors for selectively providing said driving signals, and an isolation transistor interconnected between said OR configuration and said common input/output terminal and operable in response to said driving signals for switching said switching circuit.

References Cited

UNITED STATES PATENTS

| | | | |
|---|---|---|---|
| 2,986,650 | 5/1961 | Wolfendale | 307—289 |
| 3,231,763 | 1/1966 | Mellott | 307—289 X |

JOHN S. HEYMAN, Primary Examiner

J. D. FREW, Assistant Examiner

U.S. Cl. X.R.

307—238, 291